United States Patent [19]
Takuma et al.

[11] Patent Number: 5,868,968
[45] Date of Patent: Feb. 9, 1999

[54] POLYIMIDE RESIN COMPOSITIONS FOR OPTICAL FILTERS

[75] Inventors: Keisuke Takuma; Kazuhiro Seino; Tsutami Misawa; Shoji Tamai; Wataru Yamashita, all of Kanagawa-ken, Japan

[73] Assignee: Mitsui Chemicals, Inc., Tokyo, Japan

[21] Appl. No.: 965,195

[22] Filed: Nov. 6, 1997

Related U.S. Application Data

[63] Continuation of Ser. No. 509,824, Aug. 1, 1995, abandoned.

[30] Foreign Application Priority Data

Aug. 2, 1994 [JP] Japan .................................. 6-181323

[51] Int. Cl.$^6$ ................ F21V 9/04; F21V 9/00; G02B 5/22
[52] U.S. Cl. ........................ 252/587; 252/582; 359/885
[58] Field of Search ................... 252/582, 587; 359/885, 350

[56] References Cited

U.S. PATENT DOCUMENTS

| | | | |
|---|---|---|---|
| 4,837,098 | 6/1989 | Shimamura et al. | 359/885 |
| 4,923,638 | 5/1990 | Ohno et al. | 252/587 |
| 5,049,649 | 9/1991 | Rohitkumar . | |
| 5,251,071 | 10/1993 | Kusukawa et al. | 252/582 |
| 5,449,742 | 9/1995 | Beuhler et al. | 528/353 |
| 5,534,201 | 7/1996 | Summers et al. | 252/582 |

FOREIGN PATENT DOCUMENTS

| | | |
|---|---|---|
| 0231953 | 8/1987 | European Pat. Off. . |
| 0303774 | 2/1989 | European Pat. Off. . |
| 58-46325 | 3/1983 | Japan . |
| 61-254906 | 11/1986 | Japan . |
| 62-234104 | 10/1987 | Japan . |

OTHER PUBLICATIONS

Patent Abstracts of Japan, vol. 008, No. 125 (P–279), 12 Jun. 1984 & JP–A–59029225 (Matsushita Denki Sangyo KK), 16 Feb. 1984 *abstract*.

Patent Abstracts of Japan, vol. 012, No. 028 (C–471), 27 Jan. 1988 & JP–A–62179565 (Nitto Electric Ind. Co. Ltd.), 6 Aug. 1987 *abstract*.

Patent Abstracts of Japan, vol. 013, No. 589 (C–670), 25 Dec. 1989 & JP–A–01247461 (Japan Synthetic Rubber Co. LTD.), 3 Oct. 1989 *abstract*.

Patent Abstracts of Japan, vol. 012, No. 012 (P–684), 5 Apr. 1988 & JP–A–62234104 (KYODO Printing Co. Ltd.) 14 Oct. 1987 *abstract*.

*Primary Examiner*—Philip Tucker
*Attorney, Agent, or Firm*—Burns, Doane, Swecker & Mathis, L.L.P.

[57] ABSTRACT

A polyimide resin composition for an optical filter which includes a colorless transparent polyimide resin containing at least one perfluoroalkyl group in each recurring structural unit and having excellent solvent solubility, and at least one dyestuff soluble in said resin. The dyestuff has absorption in the visible range and/or the near infrared range. A printing ink for an optical filter is composed of the polyimide resin composition and a solvent while an optical filter formed from a transparent base material and the polyimide resin composition can also be provided.

5 Claims, 7 Drawing Sheets

POLYIMIDE RESIN COMPOSITIONS FOR OPTICAL FILTERS

This application is a continuation of application Ser. No. 08/509,824, filed Aug. 1, 1995 now abandoned.

BACKGROUND OF THE INVENTION

1. Field of the Invention

This invention relates to resin compositions for the fabrication of LCD (liquid crystal display) color filters and image-scanning color separation filters, printing inks for the fabrication of such filters, and optical filters obtained using such inks.

2. Description of the Related Art

Numerous proposals have been made for the fabrication of heat-resistant color filters by using a resin composition of a polyamic acid as a precursor of a polyimide and a colorant such as a dye or pigment added thereto (for example, Japanese Patent Laid-Open No. 46325/1983, Japanese Patent Laid-Open No. 254906/1986, Japanese Patent Laid-Open No. 234104/1987, etc.). According to a process for producing a colored optical filter by using such a resin composition, a coating is first formed on a base material by such a coating technique as spin coating, roll coating or printing, and the base material with the coating formed thereon is then heated usually to 250° C. or higher, preferably to 300° C. or higher so that the polyamic acid is dehydrated and imidated. A polyamic acid is however thermally unstable in general. If a polyamic acid is left over in the form of a solution, its molecular weight may decrease, or gelation may proceed so that the solution may no longer be a homogeneous solution. This makes it difficult to form the above-described coating. As the above-mentioned heating is conducted at such a relatively high temperature, the dye or pigment is prone to pyrolysis or sublimation during the heating, leading to failure in obtaining a color filter of desired spectral characteristics in some instances.

Polyimide resins are generally known as heat-resistant resins. No technique was however known in the past for the fabrication of a filter by direct coating of a polyimide resin composition on a base material.

SUMMARY OF THE INVENTION

With a view to overcoming the above problems, the present inventors have proceeded with a wide variety of investigations. As a result, it has been found that a polyimide resin containing perfluoroalkyl groups has excellent solubility in solvents and superb miscibility with dyestuffs and also that use of a composition of this polyimide resin and a dyestuff permits easy fabrication of optical filters without the need for heating treatment at a high temperature. These findings have led to the completion of the present invention.

An object of the present invention is therefore to provide a polyimide resin composition for an optical filter by using a highly-heat-resistant, colorless and transparent, solvent-soluble polyimide without employment of a polyamic acid as a polyimide precursor and then adding a dyestuff to the polyimide, an ink produced using the resin composition, and also an optical filter obtained using the ink.

DETAILED DESCRIPTION OF THE INVENTION

Figure 1:
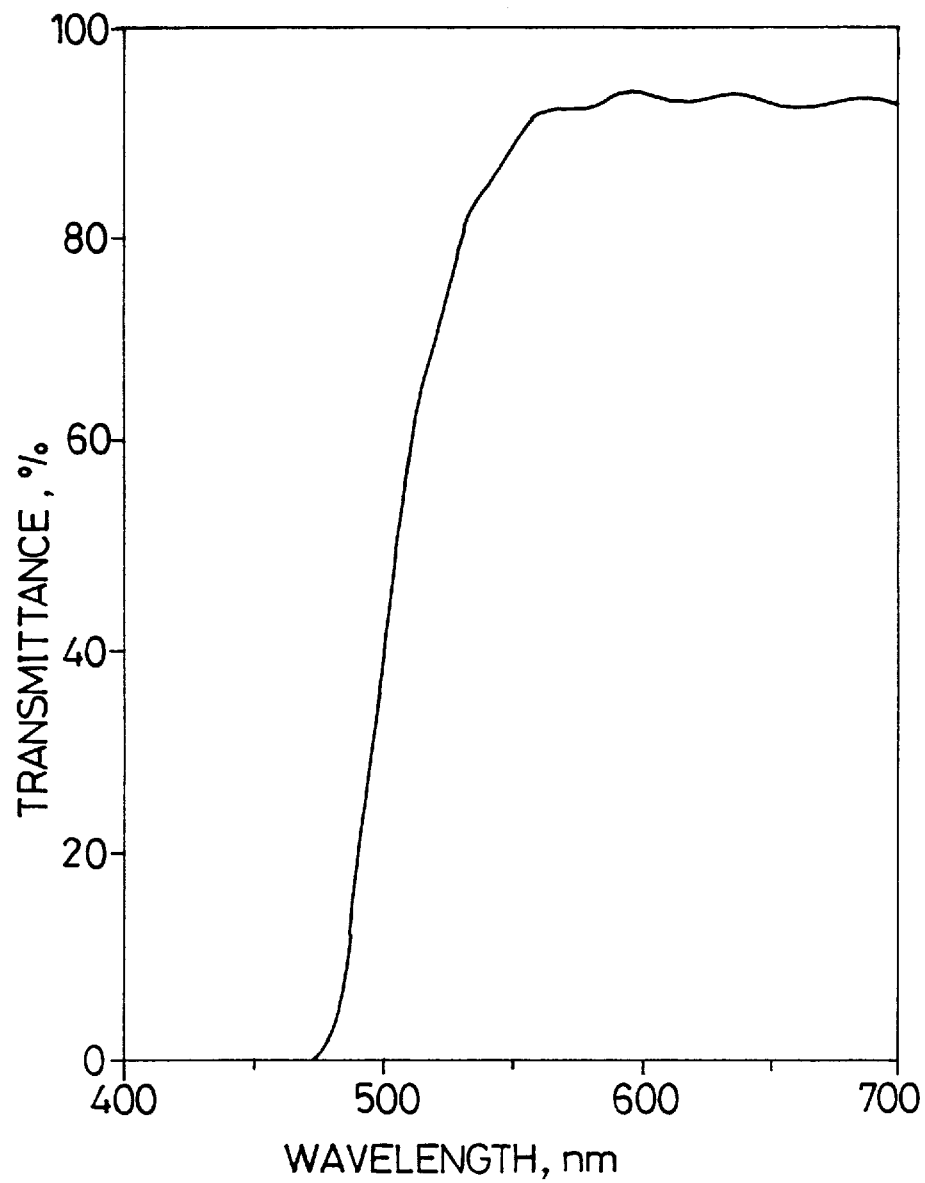
FIG. 1 diagrammatically shows spectral characteristics of a filter obtained in Example 1.

The polyimide resin composition according to the present invention for the fabrication of the optical filter is a composition in which the polyimide resin and the dyestuff have been homogeneously dissolved in each other.

The polyimide resin useful in the practice of the present invention contains at least one perfluoroalkyl group in each recurring structural unit, has excellent solubility in solvents, and is colorless and transparent. On the other hand, the dyestuff also useful in the practice of the present invention comprises at least one dyestuff which is soluble in the polyimide resin and has absorption in the visible range and/or the near infrared range.

Preferred as the polyimide resin useful in the practice of the present invention and containing at least one perfluoroalkyl group in each recurring structural unit is a polyimide resin having a recurring structural unit represented by the following formula (I) and an inherent viscosity of 0.01–3.0 dl/g [as measured at 35° C. after dissolving under heat the resin at a concentration of 0.5 g/dl in a 9/1 (by weight ratio) mixed solvent of p-chlorophenol and phenol]:

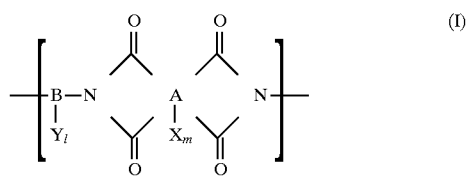

wherein A represents a tetracarboxylic acid residual group, B represents a diamine residual group, X and Y represent the same or different perfluoroalkyl group(s), l is an integer of 0–6, m stands for an integer of 0–4, and l+m is 1–10.

Illustrative of the tetracarboxylic acid residual group represented by A in the formula (I) include tetracarboxylic acid residual groups derived from pyromellitic acid dianhydride, 3,3',4,4'-biphenyl-tetracarboxylic acid dianhydride, 2,2-bis(3,4-dicarboxyphenyl)-1,1,1,3,3,3-hexafluoropropane dianhydride, 3,3',4,4'-benzophenonetetracarboxylic acid dianhydride and 2,2-bis(3,4-dicarboxyphenyl)propane dianhydride.

Examples of the diamine residual group represented by B in the formula (I) include diamine residual groups derived from diaminobenzenes, 3,3'-diaminodiphenyl ethers, 4,4'-diaminodiphenyl ethers, 2,2-bis(4-aminophenyl) hexafluoropropanes, 4,4'-diaminobiphenyls, bis(3-aminophenoxy)benzenes, bis(4-aminophenoxy)benzenes, bis(3-aminophenoxy)pyridines, bis(4-aminophenoxy)pyridines, bis(3-aminophenoxy)biphenyls, bis(4-aminophenoxy)biphenyls and bis[4-amino-α,α-bis-(trifluoromethyl)benzyl]diphenyl ethers.

In the formula (I), X and Y represent the same or different perfluoroalkyl group(s) with those having 1–6 carbon atoms being preferred. Exemplary perfluoroalkyl groups include trifluoromethyl, pentafluoroethyl, heptafluoropropyl, nonafluorobutyl, undecafluoropentyl and tridecafluorohexyl.

The above-described preferred polyimide resin contains at least any one of these perfluoroalkyl groups X and Y in the recurring structural unit represented by the formula (I). Namely, in the formula (I), l is an integer of 0–6, m stands for an integer of 0–4, and l+m is 1–10.

As specific examples of the colorless transparent polyimide resin containing at least one perfluoroalkyl group in each recurring structural unit and having excellent solvent solubility, said polyimide resin being useful in the practice of the present invention, include polyimide resins represented by the below-listed formulas (1)–(16), respectively. It should of course be borne in mind that polyimide resins usable in the present invention are not limited to them. These polyimide resins are high in heat resistance, colorlessness and transparency, and also solvent solubility.

The resins having the structures of the formulas (1)–(16) will hereinafter be abbreviated as the "resins (1) to (16)". Incidentally, polymers obtained by substituting hydrogen atoms for the fluorine atoms in the perfluoroalkyl groups in these resins cannot be used in the present invention because they have low solvent solubility, are tinged in yellow to brown colors and also poor in transparency.

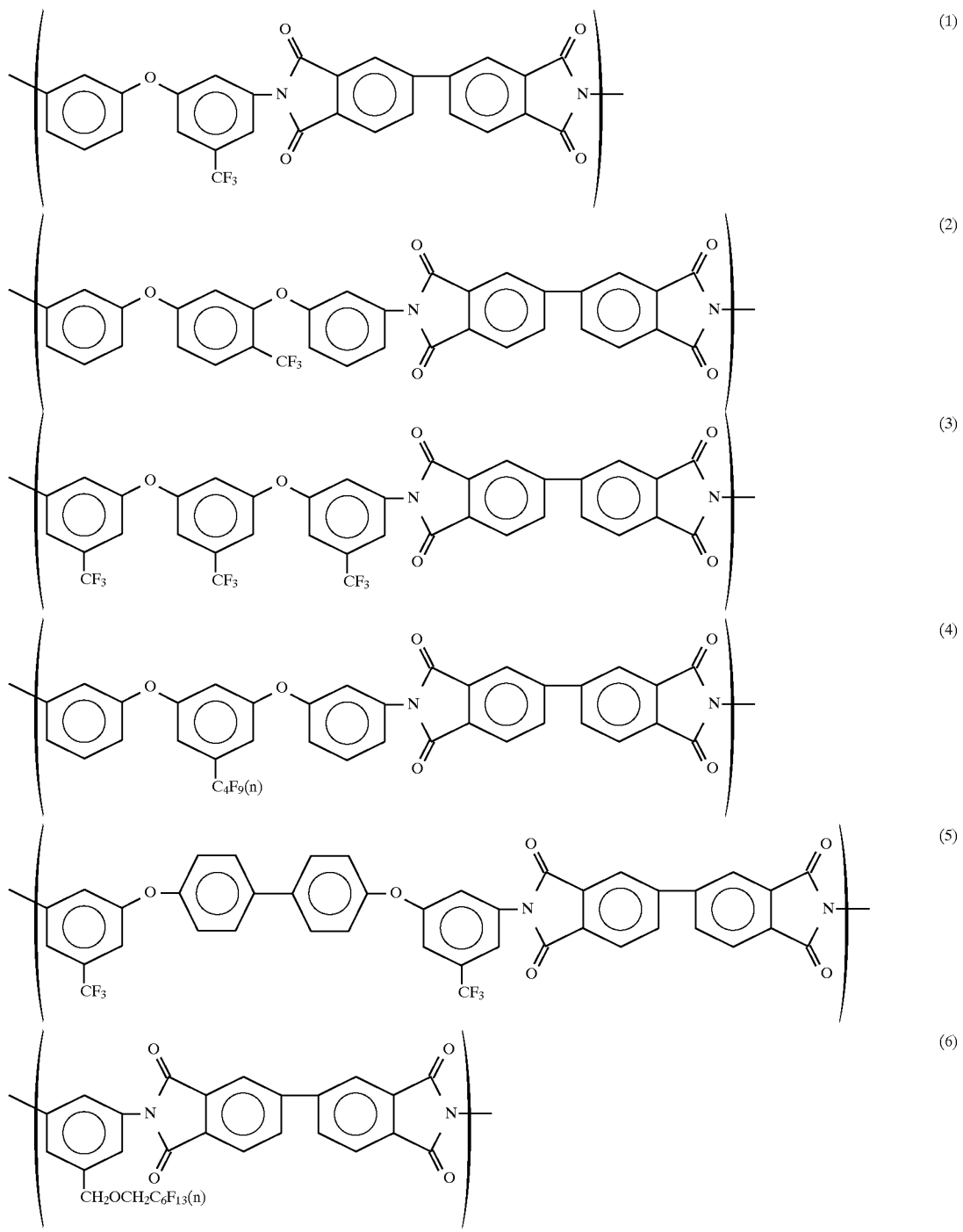

-continued
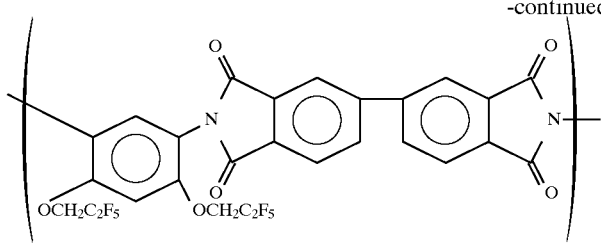 (7)
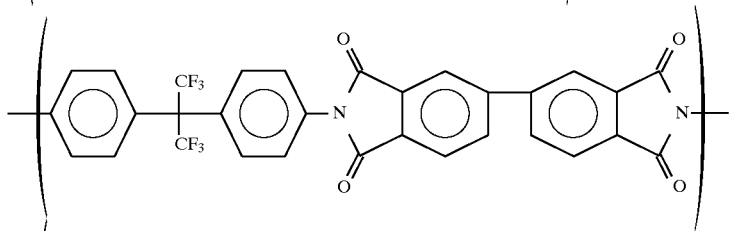 (8)
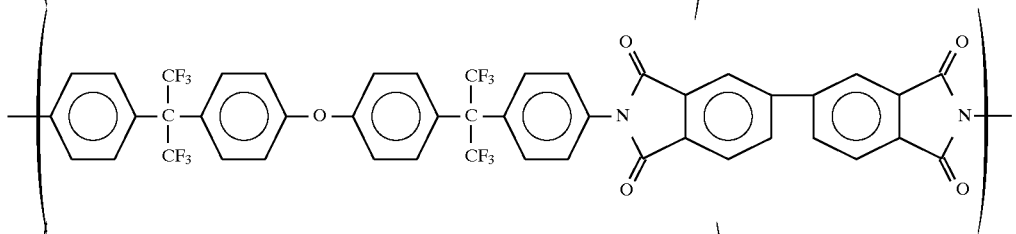 (9)
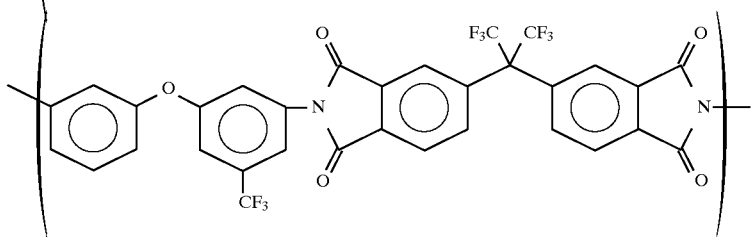 (10)
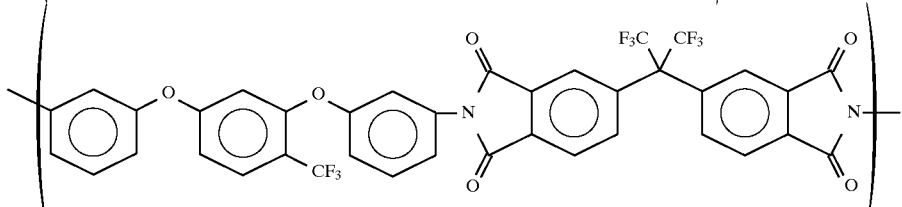 (11)
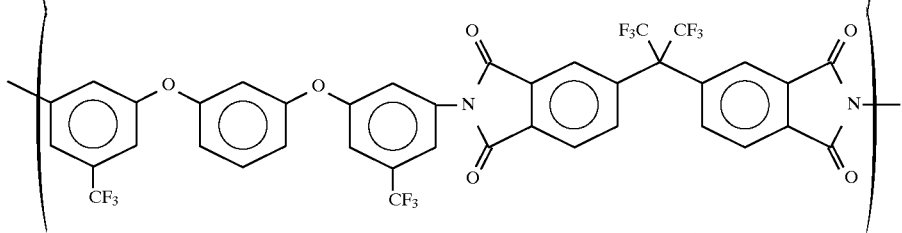 (12)
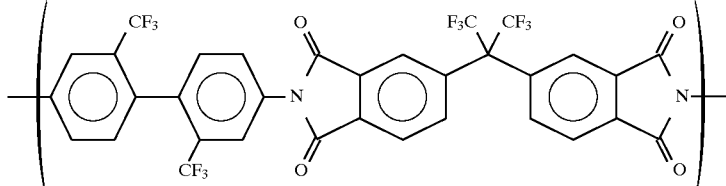 (13)
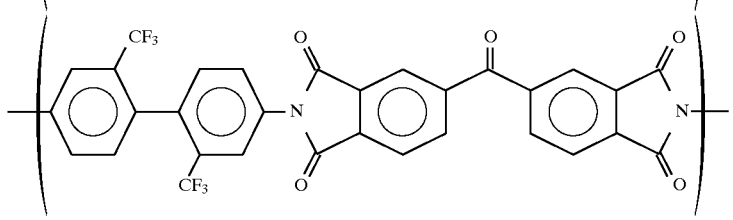 (14)

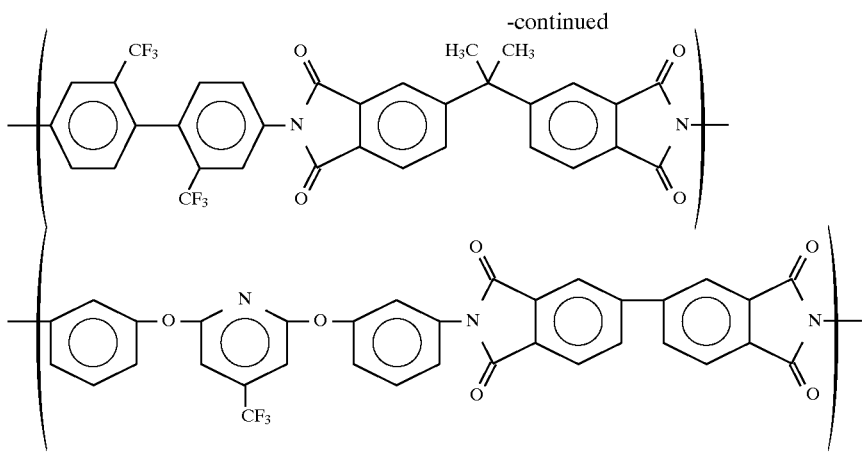

A description will next be made of processes for the production of polyimide resins which are useful in the practice of the present invention and contain recurring structural units represented by the formula (I).

The resin (1) can be obtained by reacting 3,3'-diamino-5-trifluoromethyldiphenyl ether and 3,3', 4,4'-biphenyltetracarboxylic acid anhydride at 130°300° C., preferably 170°–250° C. in a high b.p. polar organic solvent such as 1,3-dimethyl-2-imidazolidinone. Each of the remaining resins (2) to (16) can also be obtained by reacting its corresponding diamine compound and tetracarboxylic dianhydride in a similar manner as the resin (1). Such diamine compounds can be obtained following the process disclosed in U.S. Pat. No. 5,354,839. For example, the diamine corresponding to the resin of the formula (2) can be obtained by reacting 2,4-dichlorobenzotrifluoride and m-aminophenol in the presence of a base in an aprotic polar solvent. The diamine corresponding to the resin of the formula (5) can be obtained by reacting 3,5-dinitrobenzotrifluoride and 4,4'-dihydroxybiphenyl in the presence of a base in an aprotic polar solvent and then reducing the reaction product.

Preferred examples of the dyestuff, which has light absorption at predetermined wavelengths in the visible range and/or the near infrared range and is useful in the practice of the present invention, include compounds having vivid colors and high miscibility with the solvent and the resin. Illustrative visible light absorbing dyestuffs usable in the present invention include yellow dyestuffs, red dyestuffs, blue dyestuffs and green dyestuffs.

As yellow dyestuffs, azo dyestuffs, quinophthalone dyestuffs and anthraquinone dyestuffs are preferred, with dyestuffs represented by the formulas (Y-1) to (Y-4) being particularly preferred. As red dyestuffs, anthraquinone dyestuffs are preferred with those represented by the formulas (R-1) to (R-3) being especially preferred. As blue dyestuffs, anthraquinone dyestuffs are preferred with those represented by the formulas (B-1) to (B-3) being specifically preferred. As green dyestuffs, anthraquinone dyestuffs and phthalocyanine dyestuffs are preferred with those represented by the formulas (G-1) to (G-3) being notably preferred. Further, various colors can be prepared by blending two or more homochromatic and/or heterochromatic visible light absorbing dyestuffs.

As near infrared absorbing dyestuffs, phthalocyanine dyestuffs are preferred with those represented by the formulas (IR-1) to (IR-3) being particularly preferred. Like the visible light absorbing dyestuffs, two or more homochromatic and/or heterochromatic near infrared absorbing dyestuffs can be used as a blend. It is to be noted that the dyestuff having absorption in the visible range and/or the near infrared range is not limited to these exemplified ones.

(a) Dyestuffs (Y-1) to (Y-4) for yellow filters

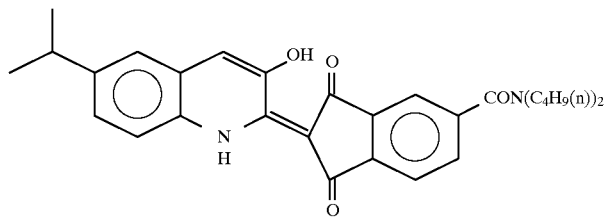

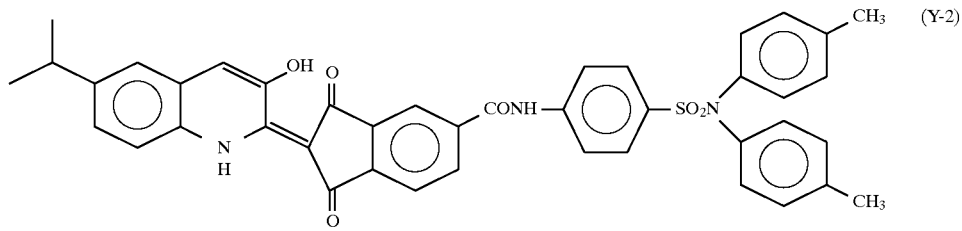

-continued
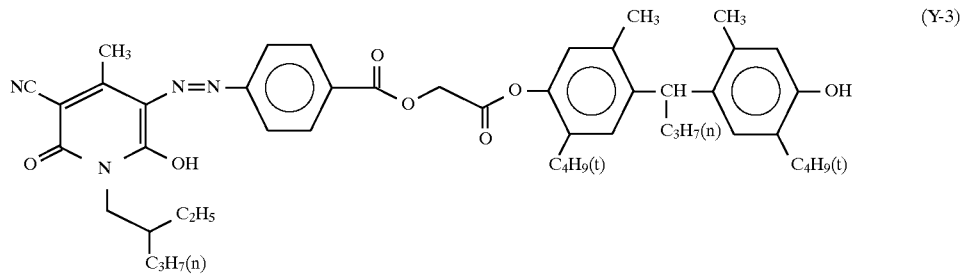
(Y-3)
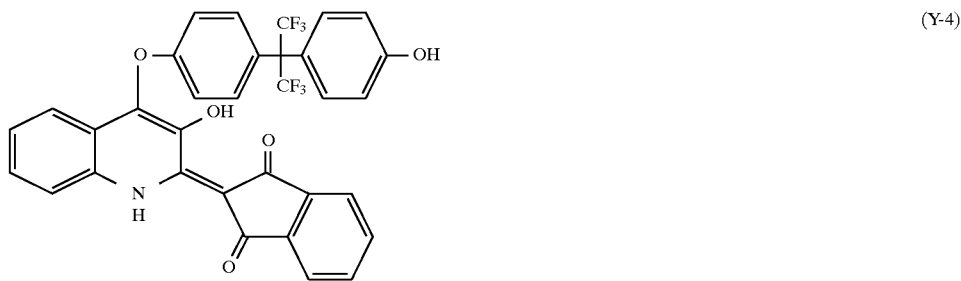
(Y-4)
(b) Dyestuffs (R-1) to (R-3) for red filters
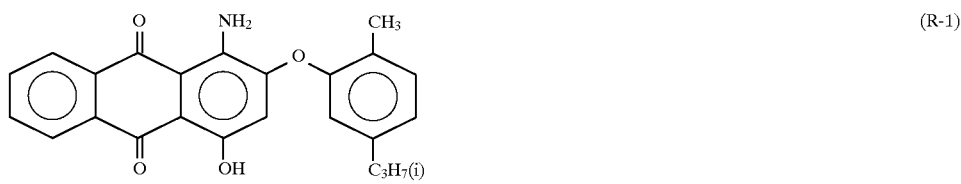
(R-1)
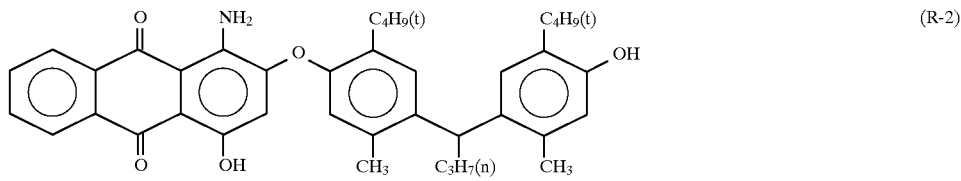
(R-2)
(R-3)
(c) Dyestuffs (B-1) to (B-3) for blue filters
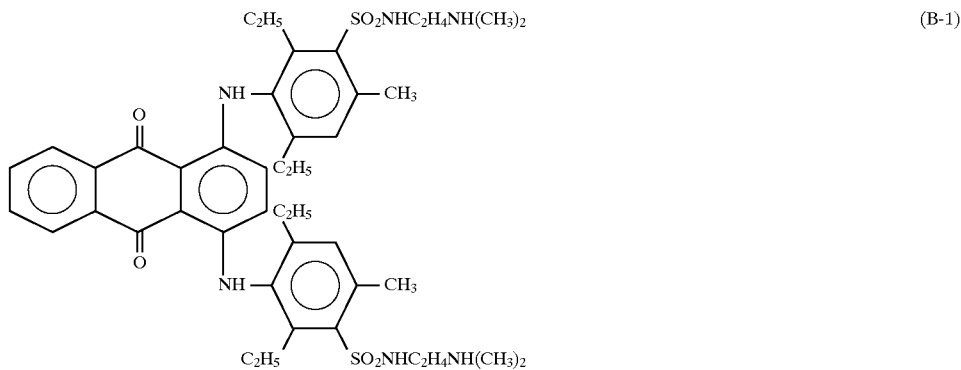
(B-1)

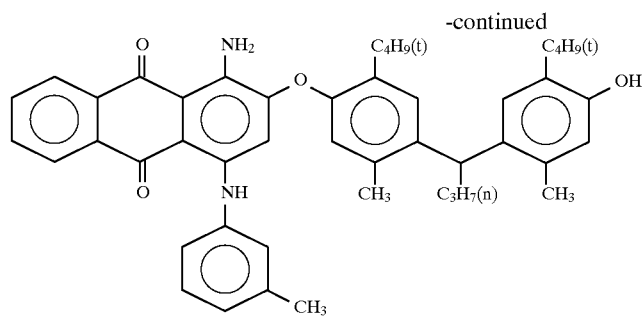
(B-2)
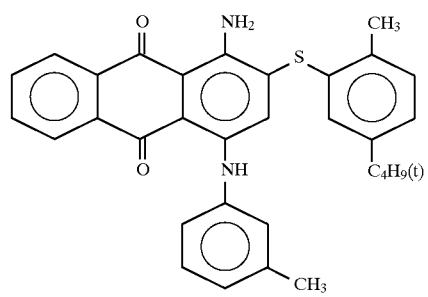
(B-3)
(d) Dyestuffs (G-1) to (G-3) for green filters
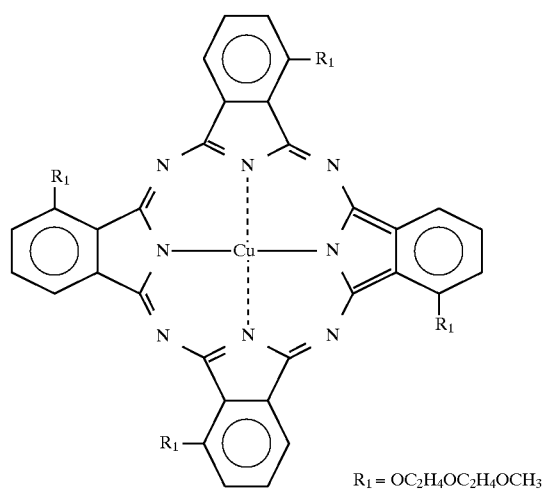
$R_1 = OC_2H_4OC_2H_4OCH_3$
(G-1)
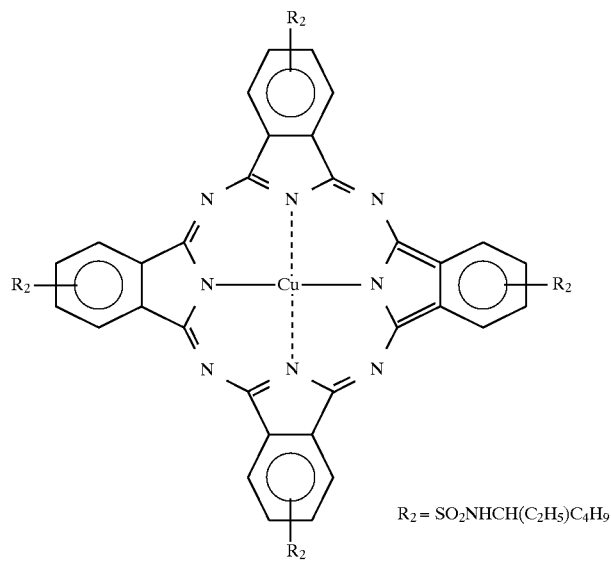
$R_2 = SO_2NHCH(C_2H_5)C_4H_9$
(G-2)

-continued
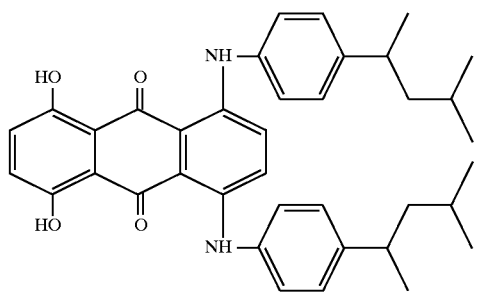
(G-3)
(e) Dyestuffs (IR-1) to (IR-3) for near infrared filters
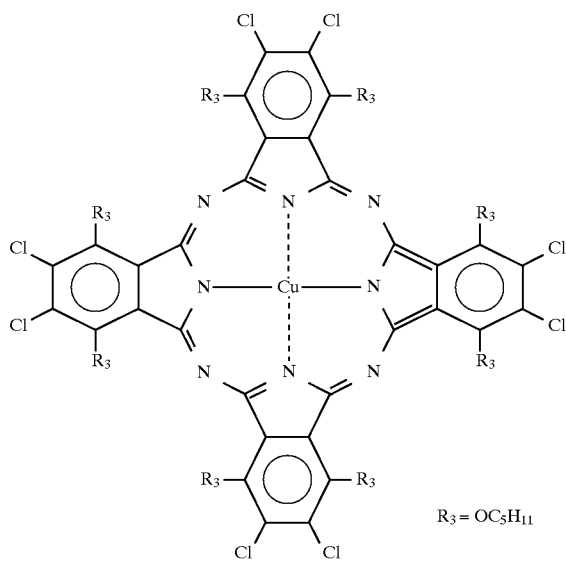
$R_3 = OC_5H_{11}$
(IR-1)
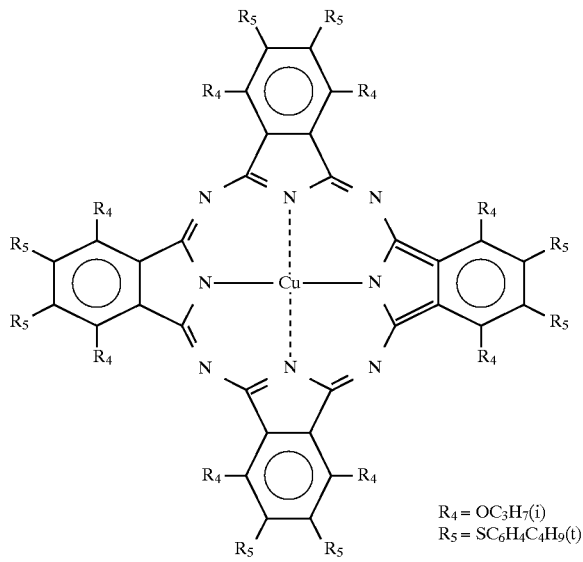
$R_4 = OC_3H_7(i)$
$R_5 = SC_6H_4C_4H_9(t)$
(IR-2)

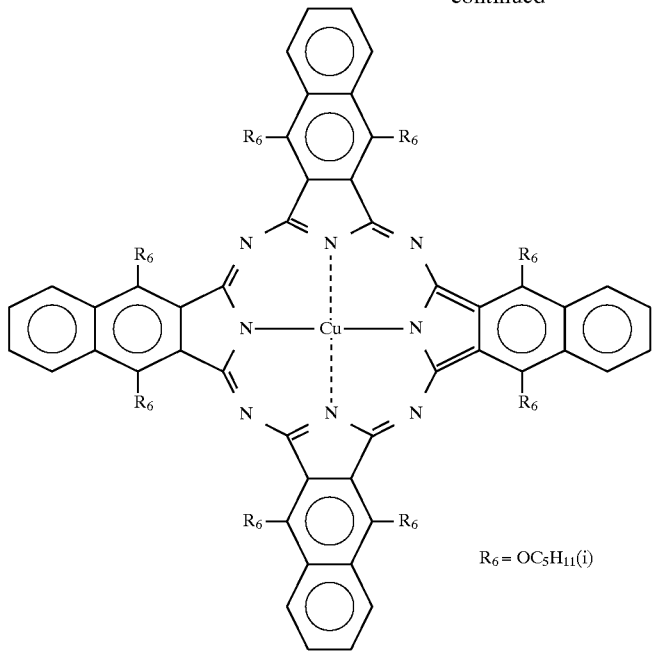

(IR-3)

$R_6 = OC_5H_{11}(i)$

These dyestuffs can be obtained by processes known per se in the art. Namely, quinophthalone compounds such as (Y-1) and (Y-2) can each be prepared, for example, by reacting quinophthalone and thionyl chloride into an acid chloride and then reacting the acid chloride with the corresponding amine derivative, as disclosed in Japanese Patent Laid-Open No. 9891/1994. On the other hand, quinophthalone compounds such as (Y-4) can each be prepared, for example, by reacting a quinophthalone compound having a halogen atom at the 4-position with the corresponding phenol derivative in the presence of a base, as disclosed in British Patent 1,324,389. Further, pyridoneazo compounds such as (Y-3) can each be prepared following the process disclosed in European Patent No. 633,296, for example, by reacting an azo compound, which has been obtained by the azo coupling between the corresponding aminobenzoic acid and pyridone compound, with the corresponding phenol.

Anthraquinone compounds such as (R-1) to (R-3), (B-1) to (B-3) and (G-3) can each be prepared following the process disclosed in Japanese Patent Laid-Open No. 5067/1993 or 255599/1993, for example, by halogenating or chlorosulfonylating the corresponding anthraquinone and then reacting the resultant product with the corresponding alcohol, amine, thiol or the like. Further, phthalocyanine compounds such as (G-1) and (IR-1) to (IR-3) can each be prepared following the process disclosed in Japanese Patent Laid-Open No. 233401/1989 or 295283/1993, for example, by reacting the corresponding phthalonitrile derivative or diiminoisoindoline derivative with the corresponding metal compound. Phthalocyanine compounds such as (G-2) can be prepared following the process disclosed in Yutaka Hosoda, *Riron Seizo Senryo Kagaku* (*Theoretical and Industrial Dye Chemistry*), pp 798–799, Kabushiki Kaisha Gihoudo, Tokyo (Oct. 1, 1963), for example, by converting the corresponding copper phthalocyanine compound into the tetrasulfonyl chloride derivative with chlorosulfonic acid and then reacting the derivative with the corresponding amine. As an alternative, commercially available, known dyes and pigments can also be used.

The content of the dyestuff in the polyimide resin composition for the optical filter, to which the present invention relates, may preferably be 1–50 wt. %, with 5–30 wt. % being particularly preferred, both based on the polyimide resin.

Further, the polyimide resin composition for the optical filter can be added with various other known additives. Illustrative additives include ultraviolet absorbents, antioxidants and light stabilizers.

Exemplary ultraviolet absorbents include those of the salicylic acid type, the benzophenone type, the benzotriazole type, the benzoate type, cyanoacrylate type and the coumarin type. When such an ultraviolet absorbent is used, it can be added preferably in an amount of 0.01–10 wt. % based on the polyimide resin.

Illustrative antioxidants include those of the phenol type, the bisphenol type, the hindered phenol type, the amine type, the hydrazine type, the sulfur type and the phosphoric acid type. When such an antioxidant is employed, it can be added preferably in an amount of 0.01–10 wt. % based on the polyimide resin.

Illustrative light stabilizers include those of the hindered amine type. When such a light stabilizer is employed, it can be added preferably in an amount of 0.01–10 wt. % based on the polyimide resin.

The polyimide resin composition for the optical filter can be prepared by simply mixing powders of the resin, the dyestuff and the like in a manner known per se in the art. Further, a resin composition in a solid form—in which the resin, the dyestuff and the like are uniformly dissolved—can be prepared by dissolving the resin, the dyestuff and the like in their good solvent and then eliminating the solvent.

The printing ink according to the present invention for an optical filter comprises the above-described polyimide resin composition for the optical filter and a solvent. As the solvent, organic solvents such as ethylcellosolve acetate, diethylene glycol dimethyl ether, toluene, methyl ethyl ketone, butyl acetate and butyl lactate can be used either singly or in combination.

Upon preparation of the printing ink (which can also be called the "coating formulation") according to the present invention for the optical filter, the solvent can be used in an amount as much as 1–10 times by weight, preferably 3–7 times by weight the polyimide resin. It is desired to add the dyestuff in an amount sufficient to attenuate at least 95%, preferably at least 98% of the wavelengths in a target range. The dyestuff can added generally in an amount of 1–50 wt. % based on the polyimide resin although the amount varies depending on the thickness of the filter.

Moreover, polymethacrylate, polystyrene, polycarbonate or the like can be added as a binder resin. Addition of such a binder resin in an amount of 10 wt. % or more based on the polyimide resin may however result in a loss of transparency.

The optical filter according to the present invention can be readily fabricated by coating a transparent base material with the printing ink for the optical filter, which has been prepared as described above, by spin coating, roll coating, printing or the like and then drying the coating so applied.

As the base material, a flat glass plate is employed usually. A transparent flat plastic plate may also be used. The above-described printing ink (coating formulation) is coated on the base material to form a coating. The thickness of the coating is adjusted to 1–100 μm or so in accordance with the application purpose. Although the drying subsequent to the coating can be carried out in air, it is preferred from the standpoint of production efficiency to conduct through-air drying at 50°–100° C.

The optical filter fabricated using the polyimide resin composition according to the present invention can effectively attenuate visible light and/or near infrared rays, and has high heat resistance and high transparency and colorlessness.

The present invention will hereinafter be described in further detail by the following examples. It is however to be borne in mind that the present invention is not limited whatsoever by the following examples.

EXAMPLE 1

To 17.5 g of ethylcellosolve acetate, were added 2 g of the resin (11), which had been obtained as will be described below, and 0.5 g of the yellow dyestuff (Y-1). The resulting mixture was stirred to completely dissolve the resin and dyestuff, whereby a clear yellow solution was obtained. Using a spin coater (manufactured by Kyoei Semiconductor K.K.), this solution was coated at 2,000 rpm on a Pyrex glass plate so that a coated plate having a yellow resin layer of 2 μm in thickness was obtained. The coated plate was dried at 80° C. for 10 minutes, whereby a yellow optical filter was obtained. Spectral characteristics of this filter are shown in FIG. 1. This filter efficiently attenuated light of 400–470 nm wavelengths, thereby demonstrating excellent optical filtering characteristics.

Further, a heat resistance test was conducted at 230° C. for 1 hour. No changes were observed in the optical characteristics, thereby showing extremely good heat resistance.

[Production of the resin (11)]

To a vessel equipped with a stirrer, a reflux condenser and a nitrogen gas inlet tube, were charged 36.04 g of 1,3-bis (3-aminophenoxy)-4-trifluoromethylbenzene, 43.09 g of 2,2-bis(3,4-dicarboxyphenyl)-1,1,1,3,3,3-hexafluoropropane dianhydride, 0.8887 g of phthalic anhydride, 1.40 g of γ-picoline, and 316.5 g of m-cresol. Under a nitrogen atmosphere, the contents were stirred at 180° C. for 4 hours. After completion of the reaction, the reaction mixture was allowed to cool down to room temperature and was then poured into 2 l of isopropanol. Subsequent to collection of a precipitated polyimide resin by filtration, the polyimide resin was washed with isopropanol and then dried, whereby 77.34 g of the resin (11) were obtained. The inherent viscosity of the thus-obtained resin was measured by the below-described method. As a result, its inherent viscosity was found to be 0.48 dl/g.

[Measurement method of inherent viscosity]

After 0.5 g of the polyimide resin in a powder form was dissolved under heat in 100 ml of a 9/1 (by weight ratio) mixed solvent of p-chlorophenol and phenol, the inherent viscosity was measured at 35° C.

EXAMPLE 2

Figure 2:
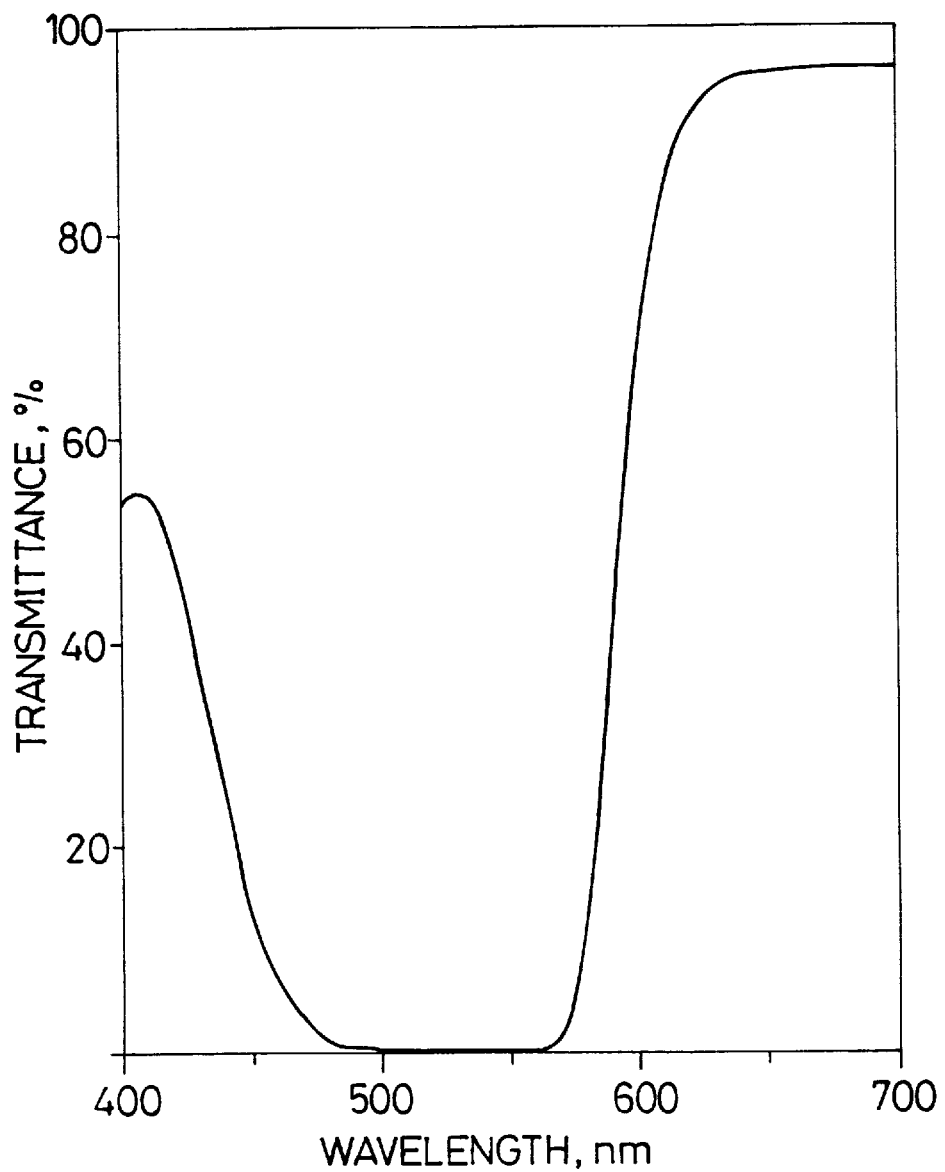
FIG. 2 diagrammatically depicts spectral characteristics of a filter obtained in Example 2.

A red optical filter was obtained in exactly the same manner as in Example 1 except that the red dyestuff (R-2) was used instead of the yellow dyestuff (Y-1). Spectral characteristics of this optical filter in the visible light range are shown in FIG. 2. This optical filter efficiently attenuated light of 480–570 nm wavelengths, thereby demonstrating excellent optical filtering characteristics.

A heat resistance test was conducted as in Example 1. Extremely good results were obtained.

EXAMPLE 3

Figure 3:
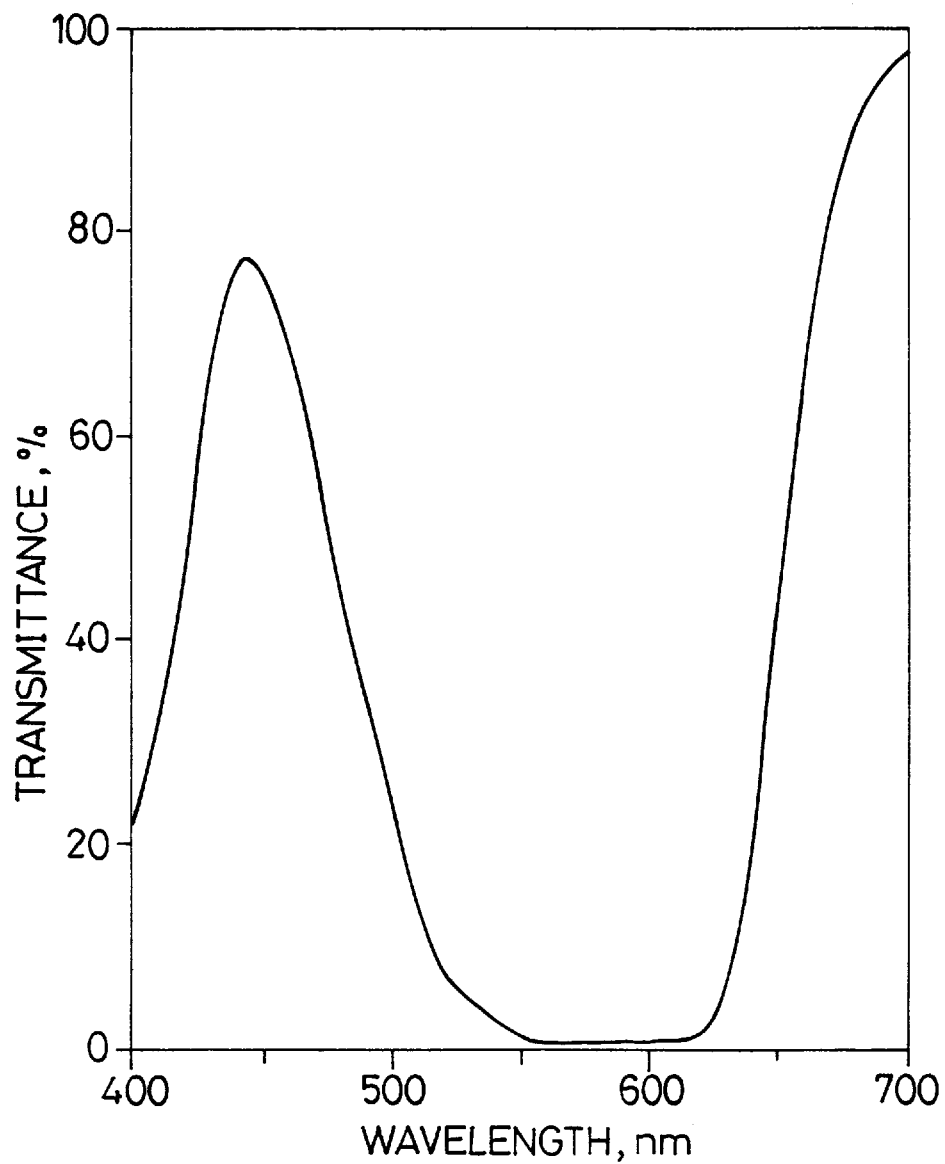
FIG. 3 diagrammatically illustrates spectral characteristics of a filter obtained in Example 3.

A blue optical filter was obtained in exactly the same manner as in Example 1 except that the blue dyestuff (B-2) was used instead of the yellow dyestuff (Y-1). Spectral characteristics of this optical filter in the visible light range are shown in FIG. 3. This optical filter efficiently attenuated light of 550–620 nm wavelengths, thereby demonstrating excellent optical filtering characteristics.

A heat resistance test was conducted as in Example 1. Extremely good results were obtained.

EXAMPLE 4

Figure 4:
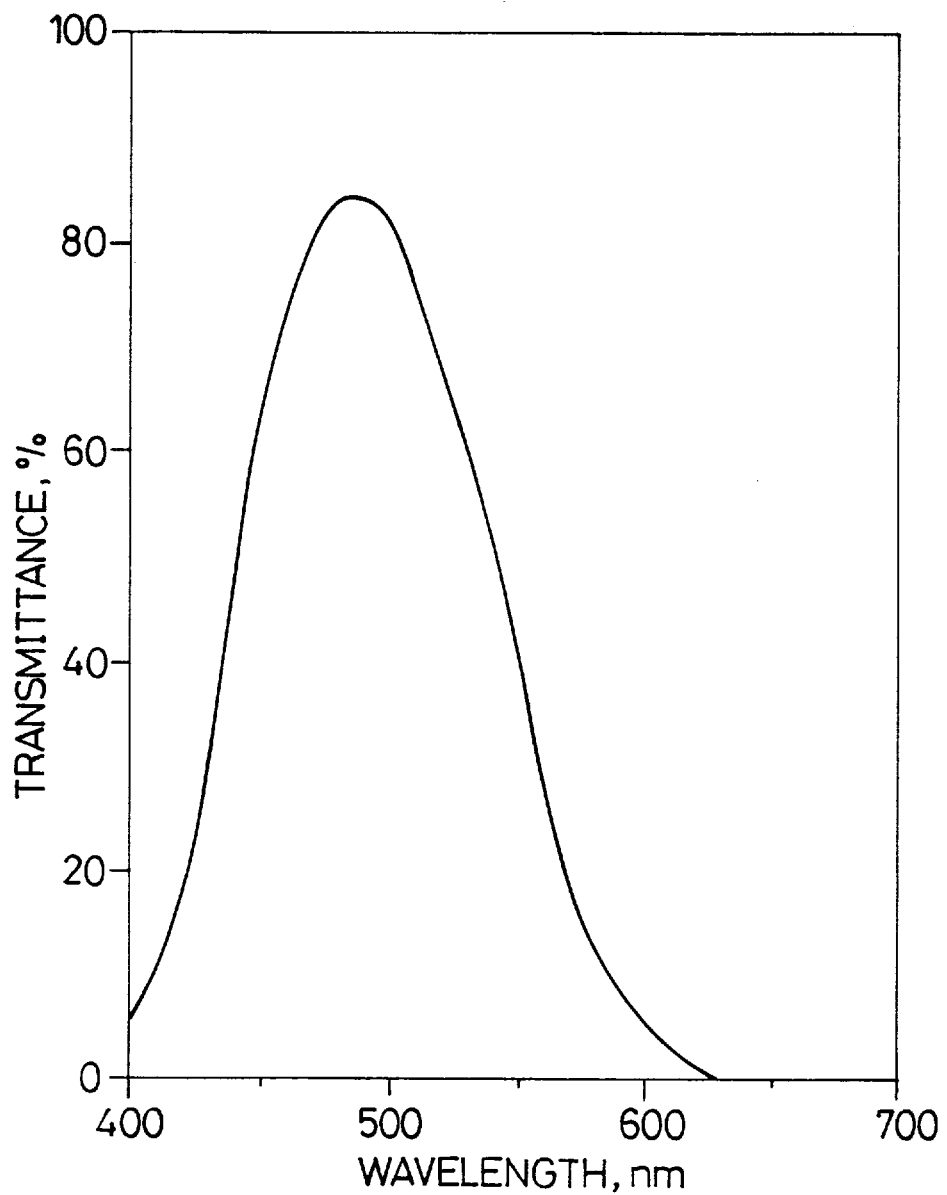
FIG. 4 diagrammatically presents spectral characteristics of a filter obtained in Example 4.

A green optical filter was obtained in exactly the same manner as in Example 1 except that the green dyestuff (G-1) was used instead of the yellow dyestuff (Y-1). Spectral characteristics of this optical filter in the visible light range are shown in FIG. 4. This optical filter efficiently attenuated light of 620–700 nm wavelengths, thereby demonstrating excellent optical filtering characteristics.

A heat resistance test was conducted as in Example 1. Extremely good results were obtained.

EXAMPLE 5

Figure 5:
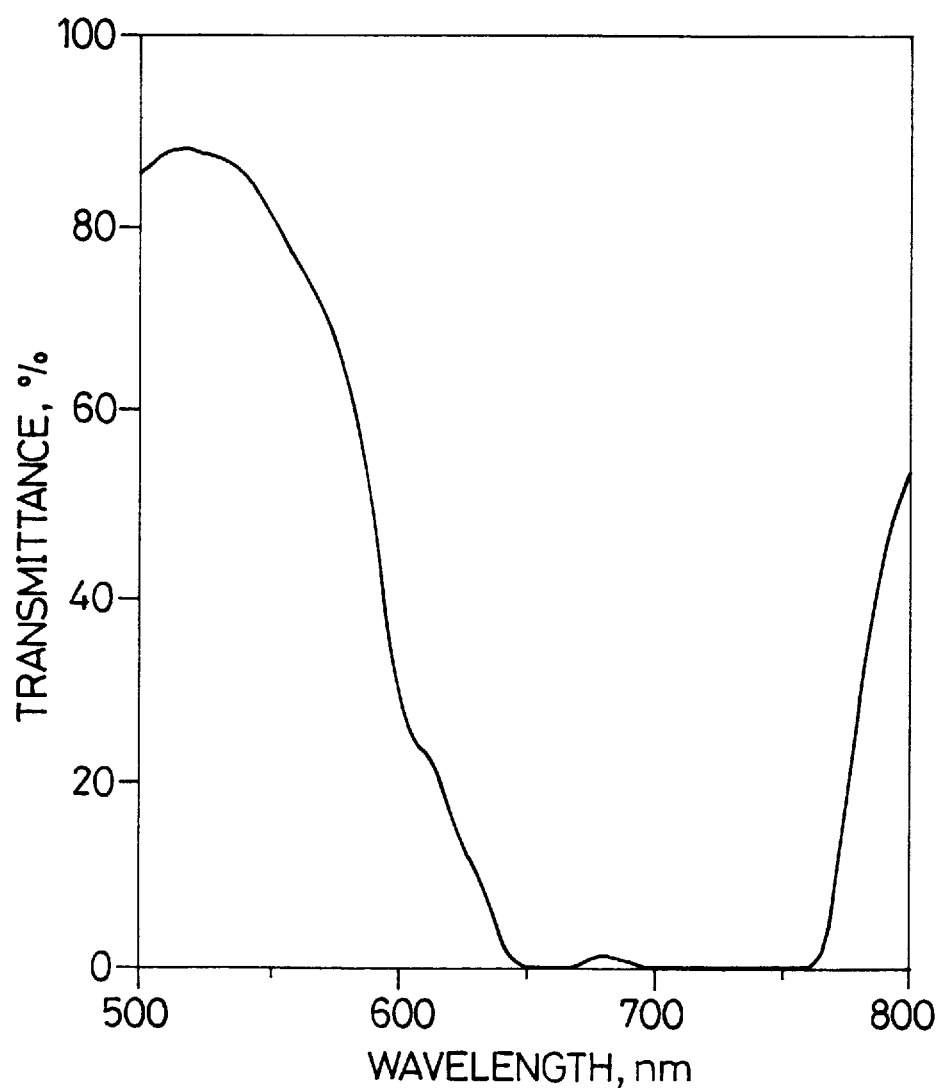
FIG. 5 diagrammatically depicts spectral characteristics of a filter obtained in Example 5.

A near infrared attenuating filter was obtained in exactly the same manner as in Example 1 except that the near infrared absorbing dyestuff (IR-1) was used instead of the yellow dyestuff (Y-1). Spectral characteristics of this optical filter in the visible light range to the near infrared range are shown in FIG. 5. This optical filter efficiently attenuated light of 660–760 nm wavelengths, thereby demonstrating excellent optical filtering characteristics.

A heat resistance test was conducted as in Example 1. Extremely good results were obtained.

EXAMPLE 6

To 17.5 g of diethylene glycol dimethyl ether, were added 2 g of the resin (2), which had been obtained as will be described below, and 0.5 g of the yellow dyestuff (Y-2). In exactly the same manner as in Example 1, a yellow optical filter was obtained.

As in Example 1, extremely good optical characteristics and heat resistance were exhibited.

[Production of the resin (2)]

The resin (2) was obtained in a similar production process as the production process of the resin (11) in Example 1 except that 28.54 g of 3,3',4,4'-biphenyltetracarboxylic acid dianhydride were added instead of 2,2-bis(3,4-dicarboxyphenyl)-1,1,1,3,3,3-hexafluoropropane dianhydride. The inherent viscosity of the thus-obtained resin was 0.52 dl/g.

EXAMPLE 7

A yellow optical filter was obtained in exactly the same manner as in Example 6 except that the yellow dyestuff (Y-4) was used instead of the yellow dyestuff (Y-2). As in Example 6, extremely good optical characteristics and heat resistance were exhibited.

EXAMPLE 8

A yellow optical filter was obtained in exactly the same manner as in Example 7 except that the resin (16), which had been obtained as will be described below, was used instead of the resin (2). As in Example 7, extremely good optical characteristics and heat resistance were exhibited.

[Production of the resin (16)]

The resin (16) was obtained in a similar production process as the production process of the resin (11) in Example 1 except that 28.54 g of 3,3',4,4'-biphenyltetracarboxylic acid dianhydride and 35.02 g of 2,6-bis(3-aminophenoxy)-4-trifluoromethylpyridine were added instead of 2,2-bis(3,4-dicarboxyphenyl)-1,1,1,3,3,3-hexafluoropropane dianhydride and 1,3-bis(3-aminophenoxy)-4-trifloromethylbenzene, respectively. The inherent viscosity of the thus-obtained resin was 0.73 dl/g.

EXAMPLES 9–16

Yellow optical filters were obtained in exactly the manner as in Example 6 except that instead of the resin (2) in Example 6, the resins (1), (3), (4), (5), (6), (7), (8) and (9) were used, respectively. These resins (1), (3), (4), (5), (6), (7), (8) and (9) had been obtained by a similar production process as the production process of the resin (11) in Example 1 and their inherent viscosities were 0.44, 0.56, 0.66, 0.72, 0.85, 0.80, 0.64 and 0.79 dl/g, respectively.

In each Example, extremely good optical characteristics and heat resistance were exhibited as in Example 1.

EXAMPLE 17

To 17.5 g of ethyl lactate, were added 2 g of the resin (10) and 0.5 g of the red dyestuff (R-1). In exactly the same manner as in Example 2, a red optical filter was obtained. As in Example 2, extremely good optical characteristics and heat resistance were obtained.

EXAMPLES 18–22

Red optical filters were obtained in exactly the same manner as in Example 17 except that instead of the resin (10) in Example 17, the resins (12), (13), (14) and (15) were used, respectively. These resins (12), (13), (14) and (15) had been obtained by a similar production process as the production process of the resin (11) in Example 1 and their inherent viscosities were 0.79, 0.88, 0.70 and 0.63 dl/g, respectively. In each Example, extremely good optical characteristics and heat resistance were exhibited as in Example 2.

Comparative Example 1

Figure 6:
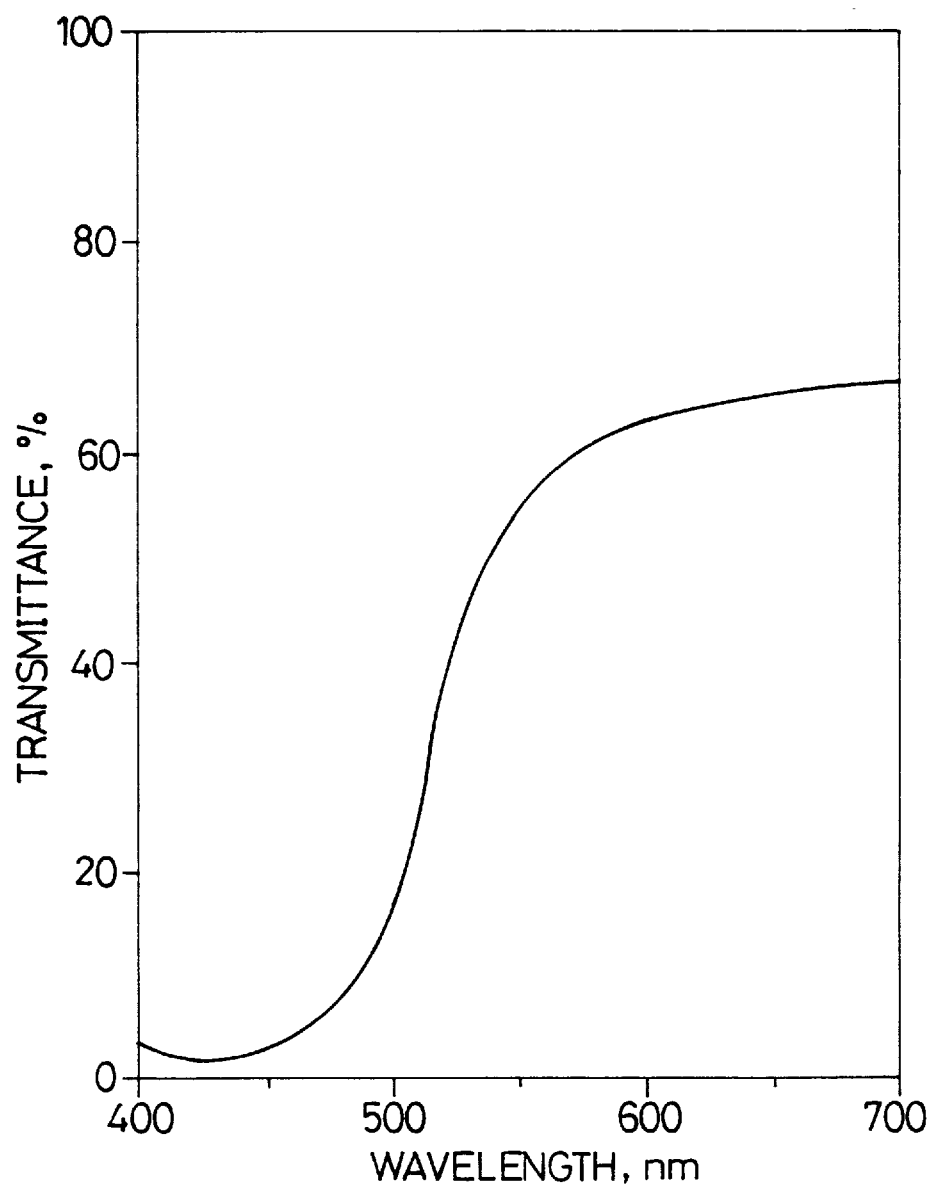
FIG. 6 diagrammatically illustrates spectral characteristics of a filter obtained in Comparative Example 1.

A yellow solution was prepared as in Example 1 except that instead of the resin (11), 2 g of the below-described resin (II) (inherent viscosity: 0.95 dl/g) obtained by a similar production process as the production process of the resin (11) in Example 1 were used. Using a spin coater, this solution was coated at 2,000 rpm on a Pyrex glass plate, thereby obtaining a coated plate having a resin layer of 2 μm in thickness and colored in yellow. The resin layer however remained turbid and yellow. Spectral characteristics of this filter in the visible light range are shown in FIG. 6. The resin layer was turbid and yellow. Due to a reduction in transparency, the transmittance dropped substantially, thereby failing to effectively eliminate light of 400–470 nm wavelengths.

Comparative Example 2

Figure 7:
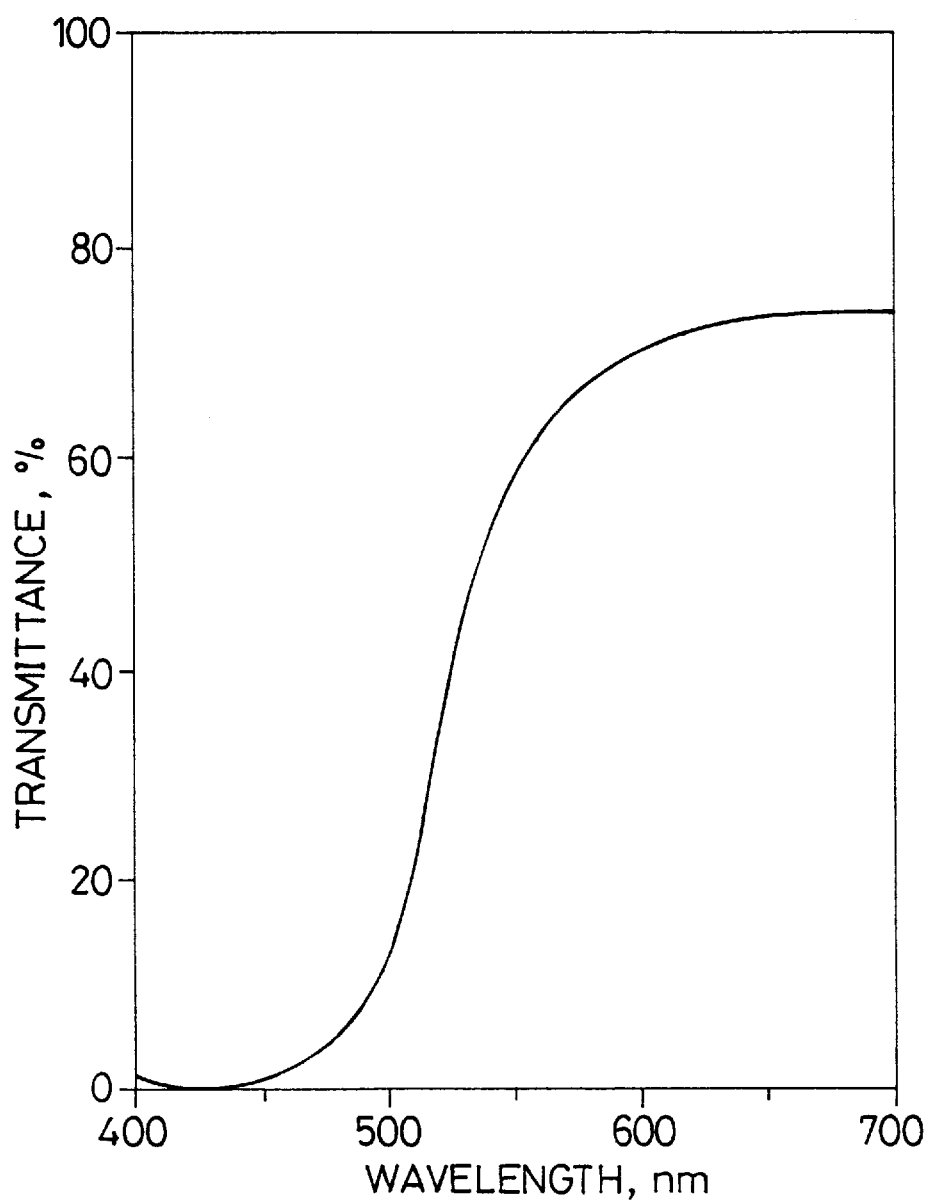
FIG. 7 diagrammatically shows spectral characteristics of a filter obtained in Comparative Example 2.

A yellow solution was prepared as in Example 1 except that instead of the resin (11), 2 g of the below-described resin (III) (inherent viscosity: 0.83 dl/g) obtained by a similar production process as the production process of the resin (11) in Example 1 were used. Using a spin coater, this solution was coated at 2,000 rpm on a Pyrex glass plate, thereby obtaining a coated plate having a resin layer of 2 μm in thickness and colored in yellow. The resin layer however became turbid and yellow so that the transparency was lowered. The thus-coated plate was dried likewise at 80° C. for 10 minutes, whereby an optical filter tinged in an yellow color was obtained. The resin layer however remained turbid and yellow. Spectral characteristics of this filter in the visible light range are shown in FIG. 7. The resin layer became turbid and yellow. Due to a reduction in transparency, the transmittance dropped substantially, thereby failing to effectively eliminate light of 400–470 nm wavelengths.

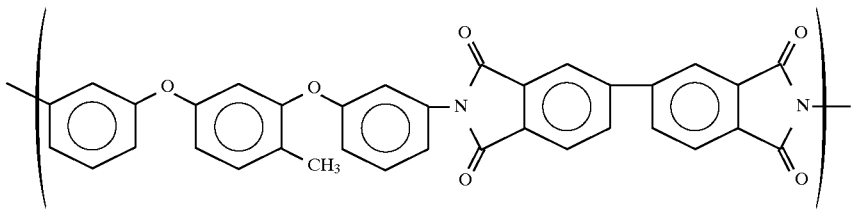

What is claimed is:

1. A polyimide resin composition for an optical filter, comprising:

a colorless transparent polyimide resin comprised of a recurring structural unit represented by the following formula (I):

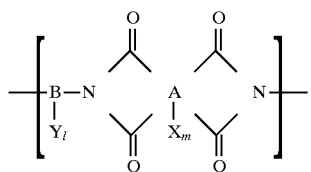

wherein A represents a tetracarboxylic acid residual group, B represents a diamine residual group, X and Y represent the same or different perfluoroalkyl group(s), l is an integer of 0–6, m stands for an integer of 0–4, and l+m is 1–10, with the proviso that when A—$X_m$ is

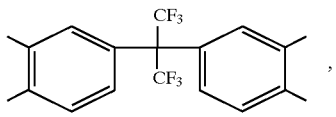

B—$Y_l$ is selected from the group consisting of

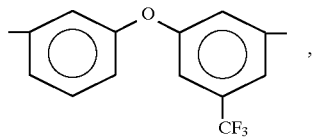

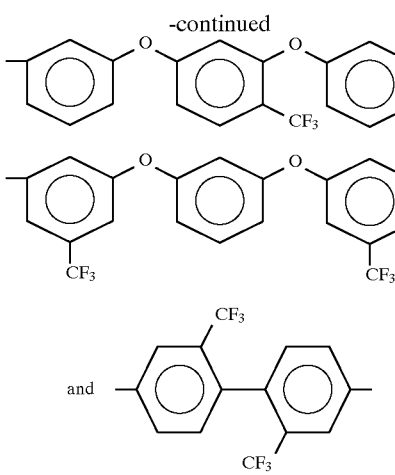

and at least one dyestuff soluble in said resin, said dyestuff having absorption in the visible range and/or the near infrared range.

2. A polyimide resin composition according to claim 1, wherein the perfluoroalkyl group is a trifluoromethyl group.

3. A polyimide resin composition according to claim 1, wherein the dyestuff is selected from the group consisting of anthraquinone dyestuffs, azo dyestuffs, quinophthalone dyestuffs and phthalocyanine dyestuffs.

4. A polyimide resin composition according to claim 1, wherein the content of the dyestuff is 1–50 wt. % based on the polyimide resin.

5. An optical filter comprising a transparent base material and the polyimide resin composition according to claim 1.

* * * * *